United States Patent [19]

Eby et al.

[11] Patent Number: 4,546,611
[45] Date of Patent: Oct. 15, 1985

[54] UF$_6$-RECOVERY PROCESS UTILIZING DESUBLIMATION

[76] Inventors: Robert S. Eby, 11 Newhope La.; Michael J. Stephenson, 115 Concord Rd., both of Oak Ridge, Tenn. 37830; Deborah H. Andrews, 421 Cumberland St., Harriman, Tenn. 37748; Thomas H. Hamilton, 821 Walker Springs Rd., Knoxville, Tenn. 37923

[21] Appl. No.: 564,113

[22] Filed: Dec. 21, 1983

[51] Int. Cl.[4] .............................................. F17C 13/00
[52] U.S. Cl. ........................................ 62/54; 62/55.5; 55/269; 220/85 VS; 220/88 B
[58] Field of Search ...................... 62/54, 55.5, 514 R; 220/85 VR, 85 VS, 88 B; 55/269

[56] References Cited

U.S. PATENT DOCUMENTS

| | | | |
|---|---|---|---|
| 3,777,928 | 10/1973 | Kober | 220/88 B |
| 3,781,407 | 12/1973 | Kamijo et al. | 220/88 B |
| 3,853,507 | 10/1974 | Monroe | 55/269 |
| 3,859,807 | 1/1975 | Benedict et al. | 62/55.5 |
| 3,859,808 | 1/1975 | Bennedict | 62/55.5 |

Primary Examiner—Ronald C. Capossela

[57] ABSTRACT

The invention is a UF$_6$-recovery process of the kind in which a stream of substantially pure gaseous UF$_6$ is directed through an externally chilled desublimer to convert the UF$_6$ directly to an annular solid ring adhering to the interior wall of the desublimer. After accumulation of a desired amount of solid UF$_6$, the desublimer is heated to liquefy the solid. Subsequently, the liquid is recovered from the desublimer. It has been found that during the heating operation the desublimer is subjected to excessive mechanical stresses. In addition, it has been found that the incorporation of a very small percentage of relatively noncondensable, nonreactive gas (e.g., nitrogen) in the UF$_6$ input to the desublimer effects significant decreases in the stresses generated during the subsequent melting operation. This modification to the process provides valuable advantages in terms of reduced hazard, lower operating costs for the desublimer, and increased service life for the desublimer and its auxiliaries. The new process is especially suitable for the recovery of enriched UF$_6$ from high-speed UF$_6$ gas-centrifuge cascades.

9 Claims, 6 Drawing Figures

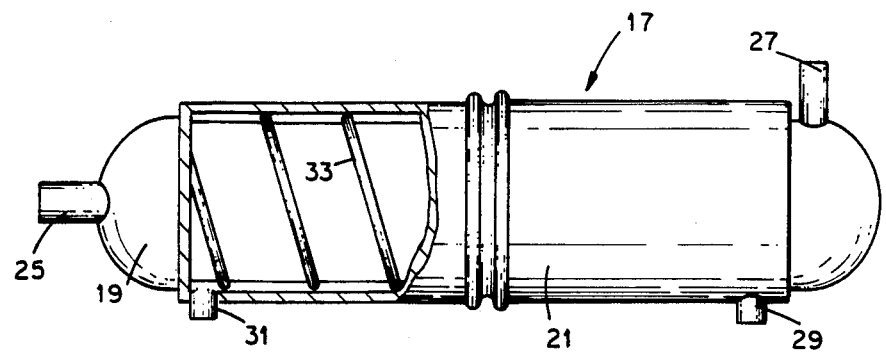
_Fig. 2_
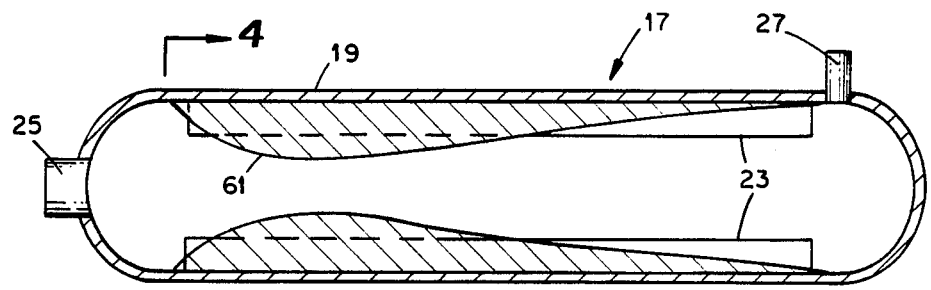
_Fig. 3_
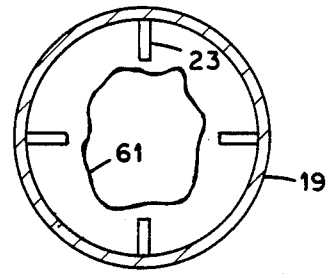
_Fig. 4_

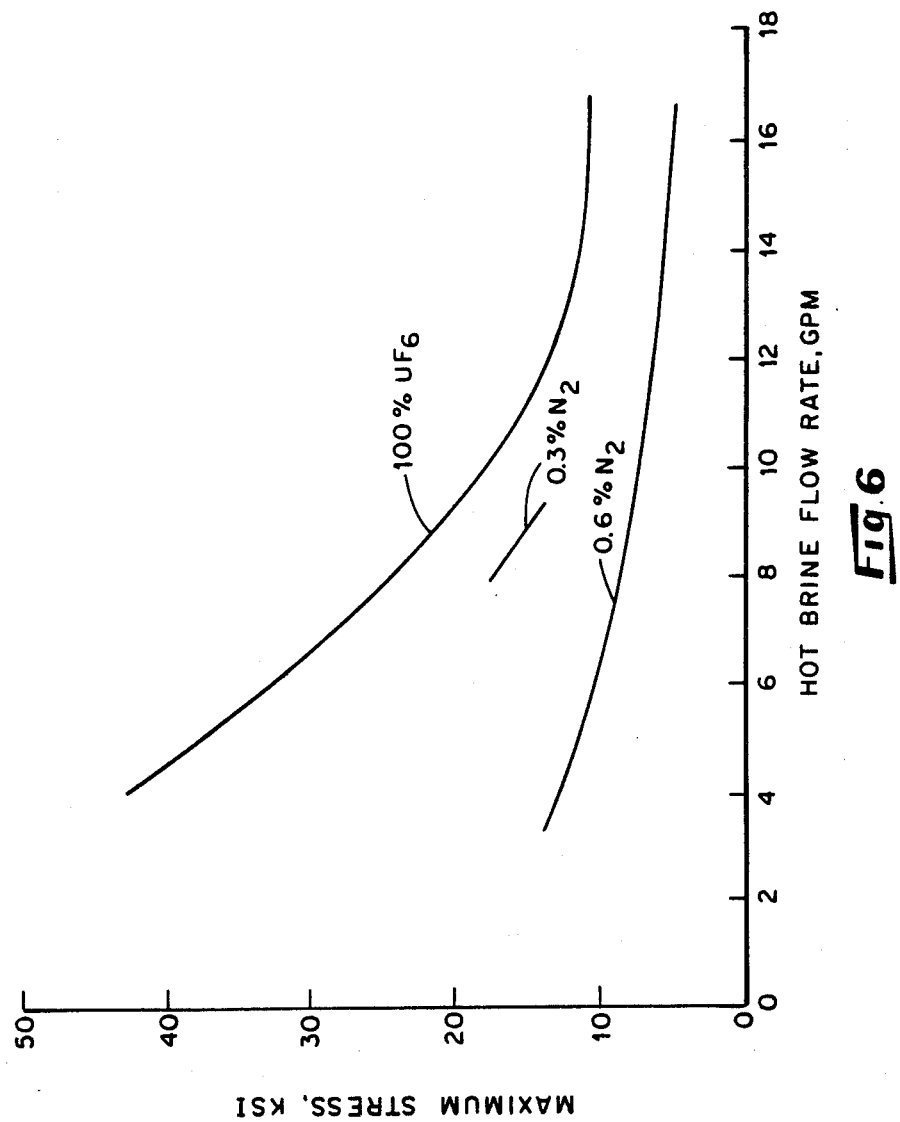

UF$_6$-RECOVERY PROCESS UTILIZING DESUBLIMATION

BACKGROUND OF THE INVENTION

This invention relates broadly to UF$_6$-recovery process entailing direct conversion of gaseous UF$_6$ to a solid in a desublimer (cold trap), the desublimer subsequently being heated to convert the UF$_6$ to a fluid. More particularly, it relates to a novel process for recovering process gas from a UF$_6$ gas-centrifuge cascade. The invention is a result of a contract with the United States Department of Energy.

The invention was made in the course of experiments conducted to determine the most suitable method for recovering UF$_6$ from a projected gas-centrifuge cascade of the kind described briefly in a report entitled "United States Gas Centrifuge Program for Uranium Enrichment", Union Carbide Corporation, Nuclear Division, Oak Ridge, Tenn. (June 2, 1981). Referring to FIG. 1, the cascade 9 is designed to receive a feed stream 11 of process gas (UF$_6$) and to separate the same into a $^{235}$U-depleted waste stream 13 and a $^{235}$U-enriched product stream 15. As shown, the cascade comprises a series of stages, each including a plurality of gas centrifuges 16. Each centrifuge is provided with an inlet for feed gas and outlets for enriched gas and depleted gas, respectively. As indicated, the centrifuges for a given stage are connected in parallel.

The product stream 15 from the cascade is virtually pure gaseous UF$_6$ which is at a pressure below atmospheric. The amount of noncondensable gases (e.g., nitrogen) in the stream normally is below 0.2% by volume. Because UF$_6$ is desublimable (it condenses directly from a gas to a solid at temperatures below 55.6° C. under 760 mm pressure), tests were conducted to establish whether the cascade product could be recovered efficiently by (a) directing the product stream through a desublimer to condense the UF$_6$ as a solid; (b) heating the UF$_6$-loaded desublimer to liquefy the solid UF$_6$; and (c) recovering the liquid UF$_6$.

The tests were conducted by directing a stream of virtually pure, gaseous UF$_6$ at subatmospheric pressure through basically conventional cold traps having means for external cooling and heating. The typical trap comprised a horizontally oriented metal tube having a uniform diameter and containing internal, longitudinally extending cooling fins. Strain gages were mounted to the exterior wall of the trap at various points. Typically, desublimation of the UF$_6$ was effected at −100° F., at which temperature the UF$_6$ deposited on the inside wall of the tube as an annular, crystalline layer. The layer was up to three inches thick and extended extending for most of the length of the tube. Subsequently, this layer was melted by heating the trap to 175° F., well above the triple point for UF$_6$. In the course of these tests, it was discovered that excessive mechanical stresses often were generated in the traps during the heating cycle. In a test conducted with an aluminum-alloy trap, the stresses were sufficiently large to split a longitudinal welded seam of the trap.

In an attempt to avoid the development of such large stresses, a UF$_6$ cold trap was designed with internal wedge-shaped fins to act as stress breakers. Tests conducted with UF$_6$ showed that the fins did not provide sufficient stress relief.

The use of cold traps (desublimers) to remove UF$_6$ from gas streams consisting of UF$_6$ and about 30%–76% nitrogen is disclosed in the following co-assigned patents: U.S. Pat. No. 3,853,507 (Dec. 10, 1974); U.S. Pat. No. 3,859,507 (Jan. 14, 1975); and U.S. Pat. No. 3,958,808 (Jan. 14, 1975). The UF$_6$ is trapped as a solid, following which the traps are heated to permit recovery of the UF$_6$ as a liquid.

SUMMARY OF THE INVENTION

Accordingly, it is an object of the invention to provide a novel process for directly converting gaseous UF$_6$ to a solid and subsequently heating the solid in situ to convert it to a fluid.

It is another object to provide a novel process for recovering UF$_6$ from a UF$_6$ gas-centrifuge cascade.

It is another object to provide an efficient and relatively inexpensive process for recovering UF$_6$ by solidifying the same in an externally chilled desublimer and then heating the desublimer to convert the solid to a fluid, the process being especially designed to decrease stresses generated in the desublimer during heating.

In one aspect, the invention is a UF$_6$-recovery process in which a stream of UF$_6$ process gas is withdrawn from a gas-centrifuge cascade. A relatively noncondensable, nonreactive gaseous component is added to the withdrawn stream to provide a concentration of from about 0.2 to 1% by volume of the noncondensable therein. The resulting stream is directed through a cooled chamber under conditions effecting desublimation of the UF$_6$ and formation of an adherent, annular solid layer thereof on the interior of the chamber. The chamber then is heated to convert the layer to a fluid, and the latter is recovered from the chamber. In another aspect, the invention is an improvement in a process of the kind including the steps of generating a stream of substantially pure gaseous UF$_6$, feeding the stream through an externally chilled desublimer to effect desublimation of the UF$_6$ to an annular crystalline solid adhering to the desublimer, and heating the desublimer to convert the layer to fluid UF$_6$. The improvement comprises the method of decreasing mechanical stresses generated in the desublimer when so heated by adding a noncondensable, nonreactive gas to the UF$_6$ stream in an amount sufficient to provide therein a concentration of from about 0.2% to 10% by volume of the noncondensable.

BRIEF DESCRIPTION OF THE DRAWINGS

FIG. 2 is a side view of a UF$_6$ desublimer designed to be alternately chilled and heated;

FIG. 3 is a longitudinal sectional view of a desublimer shell designated as 19 in FIG. 2, showing a layer of desublimed UF$_6$ deposited therein;

FIG. 4 is a cross-sectional view taken along lines 4—4 of FIG. 3;

FIG. 5 is a schematic diagram of a system for recovering UF$_6$ in accordance with the invention and utilizing a desublimer of the kind shown in FIGS. 2, 3 and 4; and FIG. 6 is a graph correlating maximum desublimer stress and heated-brine flow for selected feed-gas compositions in the system shown in FIG. 5.

Figure 1:
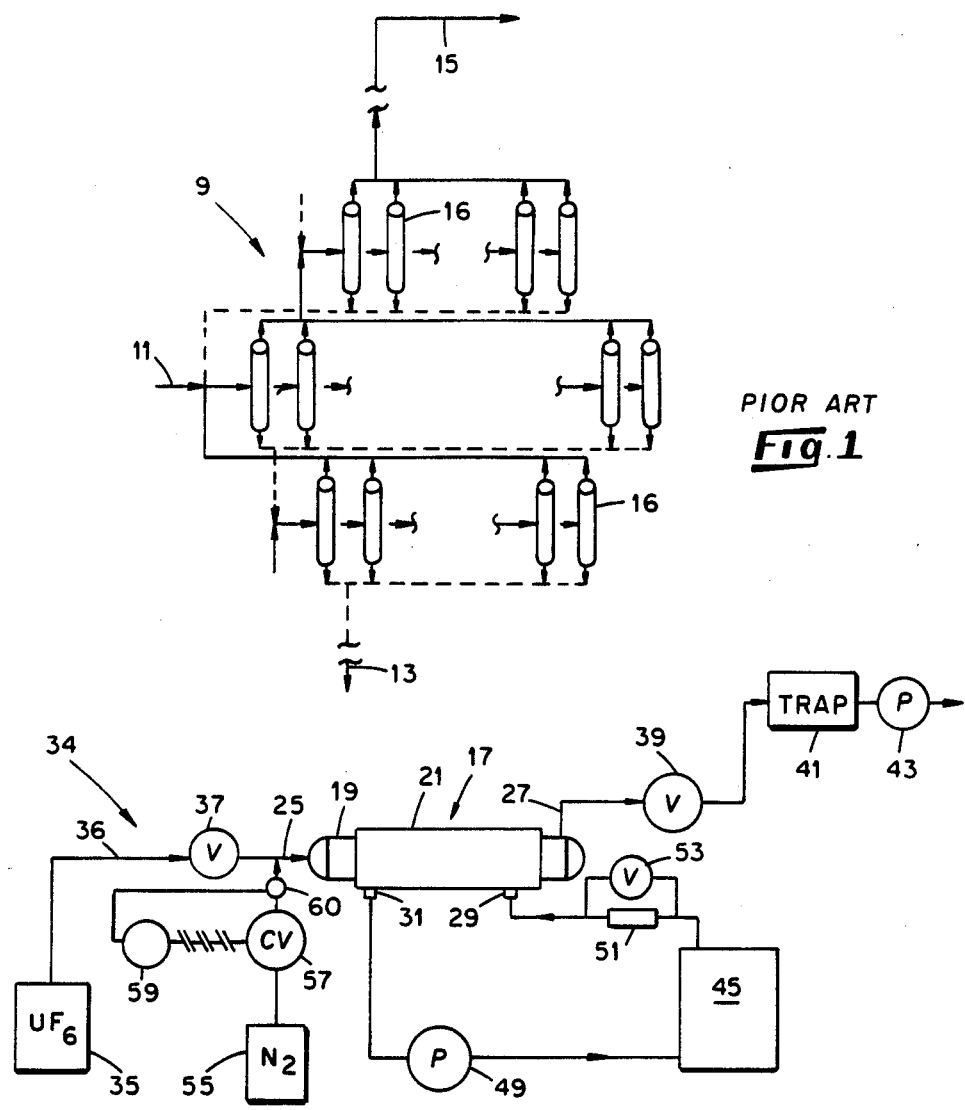
FIG. 1 is a schematic diagram of a conventional UF$_6$ gas-centrifuge cascade for separating gaseous UF$_6$ into an upflowing stream (solid lines) enriched in uranium-235 and a downflowing stream (broken lines) depleted in the same.

The drawings are not to scale.

DETAILED DESCRIPTION OF THE INVENTION

After finding that excessive mechanical stresses were generated in the $UF_6$ desublimer during the heating cycle (see "Background"), we determined that such stresses resulted because the coefficient of thermal expansion for solid $UF_6$ is large compared to the coefficient for the metal of which the trap was composed (nickel, aluminum, or monel). As a result, heating of the desublimer causes the crystalline $UF_6$ layer to expand to a greater extent than the desublimer wall encompassing the same, generating surprisingly large stresses in the wall. We found that the maximum stress developed during desublimer heating is directly proportional to the amount of solid $UF_6$ deposited and inversely proportional to the rate of heat-up.

While investigating $UF_6$ cold-trap efficiency, we conducted tests to determine how the efficiency was affected by changes in temperature, pressure, gas composition, and the like. Unexpectedly, we found that the incorporation of a small percentage of noncondensable, nonreactive gas in the $UF_6$ input to the trap produced significant decreases in the mechanical stresses generated during the heating cycle. While the reason for the resulting reduction in stresses is not yet well understood, we have shown that the modification provides valuable advantages. For example, more $UF_6$ can be deposited in the desublimer before the maximum permissible stress level is reached. As a result, long-term operation of the desublimer can be achieved with fewer temperature cycles. (A temperature cycle comprises a $UF_6$-solidification operation conducted at, say, $-100°$ F. and a $UF_6$-melting operation conducted at, say, $175°$ F.). Reducing the number of such cycles decreases energy costs and operation hazards, while increasing the operating life of the desublimer and its associated equipment (pumps, valves, heaters, etc.).

The following is a more detailed description of the invention.

EXAMPLE

Referring to FIGS. 2-4, tests of the invention were conducted with a metal desublimer 17, which included at 16"-diameter, 12'-long shell 19 and an external jacket 21. The shell was fabricated with internal longitudinal fins 23, a gas inlet 25, and a gas outlet 27. The jacket was provided with an inlet 29 and outlet 31 for brine utilized as a cooling/heating medium. A coil 33, mounted between the shell and jacket, defined a helical brine-flow path extending between the inlet 29 and outlet 31. The shell assembly was composed of monel-400 ($\alpha$, $7.5 \times 10^{-6}$ in/in-°F. at 140° F.). The $\alpha$ for solid (crystalline) $UF_6$ at the same temperature is $1.9 \times 10^{-4}$ in/in-°F.

Referring to FIG. 5, the desublimer 17 was connected in a system 34 which consisted of conventional components, including a supply 35 of virtually pure gaseous $UF_6$ at subatmospheric pressure. The supply was connected to the desublimer inlet 25 via a line 36 containing a block valve 37. The desublimer outlet 27 was connected through a valve 39 to a $UF_6$ chemical backup trap 41, whose outlet was connected to the inlet of a vacuum pump 43, vented to atmosphere. The system included a brine tank 45, which was provided with refrigeration means (not shown). A pump 49 was connected to the tank to circulate brine through a loop including the desublimer jacket 21 and a heater 51 bridged by a bypass valve 53.

In accordance with the invention, a supply 55 of gaseous nitrogen was connected to the desublimer inlet line 36 via a control valve 57. A standard thermal mass flow control arrangement 59-60 was connected as shown to maintain the nitrogen concentration in the $UF_6$ input to the desublimer at a selected low value.

The above-described system was operated to determine the effectiveness of the invention by conducting several sets of runs, each set including a control run and at least one experimental run conducted in accordance with the invention. In the typical control run, the system first was operated in the conventional desublimation mode—i.e., with no addition of nitrogen to the $UF_6$ feed, with the heater 51 bypassed, and with chilled brine ($-100°$ F.) circulated about the shell 19. The gas velocity in the desublimer tube was about 10 ft./sec. Desublimation was conducted until a preselected weight of $UF_6$ accumulated in the desublimer. Then the refrigeration system for the tank 45 was turned off. The $UF_6$ deposit was a glassy layer (61, FIG. 4) which adhered to the interior of the shell and which had the profile shown in FIG. 3. Following loading, the desublimer was operated in the $UF_6$-melting mode—that is, with the heater 51 connected into the brine loop and with heated brine (175° F.) circulated at a selected rate about the shell 19 until the $UF_6$ layer was liquefied. The brine flow rate and the maximum stress generated in the shell 19 during heating were recorded.

The experimental runs were conducted under the same conditions as their respective controls, with the exception that nitrogen from the supply 55 was introduced to the $UF_6$ feed stream in an amount providing a constant nitrogen concentration of either 0.3% or 0.6% by volume. The following table summarizes the results obtained in four sets of runs.

| Total $UF_6$ load, lbs. | Heated Brine Flowrate, gpm | Percent Non-condensables | Maximum Stress Measured, psi |
| --- | --- | --- | --- |
| 336 | 16 | 0.0 | 12,500 |
| 332 | 16 | 0.6 | 5,000 |
| 323 | 16 | 0.6 | 9,000 |
| 957 | 4.5 | 0.0 | 43,100 |
| 960 | 4.5 | 0.6 | 20,400 |
| 992 | 10 | 0.0 | 33,700 |
| 971 | 10 | 0.0 | 39,800 |
| 1004 | 10 | 0.0 | 38,000 |
| 972 | 8.5 | 0.3 | <26,400 |
| 1834 | 13 | 0.0 | 24,000 |
| 1801 | 13 | 0.3 | 15,400 |
| 1836 | 13 | 0.3 | 15,800 |

As shown in the table, the inclusion of a very small concentration of nitrogen in the $UF_6$ feed produced significant decreases in the maximum stress developed in the shell 19, the percentage of stress reduction being greater at 0.6% nitrogen than at 0.3%. This improvement was obtained with no appreciable change in desublimation efficiency—i.e., with substantially no increase in the amount of $UF_6$ carried out of the desublimer during loading of the $UF_6$. The addition of the nitrogen produced essentially no change in the solidified-$UF_6$ profile in the shell 19.

As stated previously, we have found that the maximum stress developed during the desublimer heating cycle is inversely related to the heat-up rate. The table shows, however, that the invention was effective at low as well as high heat-up rates (brine flowrates). FIG. 6 is a graphical correlation of maximum stress and brine flowrate for three $UF_6$ feed gases respectively containing 0.0% nitrogen, 0.3% nitrogen, and 0.6% nitrogen.

As applied to the recovery of $UF_6$ product from a gas-centrifuge cascade, our process may be conducted in a system of the kind described above and shown in FIG. 5, with the exception that the $UF_6$ input to line 36 would be derived from the cascade product line (15, FIG. 1). The invention is especially well suited to the recovery of enriched (highly valuable) $UF_6$, because only very small concentrations of the noncondensable gas need be used to achieve large reductions in the maximum stress. Relatively large concentrations (i.e., greater than 10%) of the noncondensable would be objectionable because (1) they decrease the heat-transfer rate in the desublimer and (2) they promote carry-over of valuable gaseous or particulate $UF_6$ from the desublimer. If desired, the invention may be used for the recovery of $UF_6$ from any portion of a gas-cartridge cascade. The invention is not limited to desublimers associated with gas-centrifuge cascades, and in some applications the concentration of the noncondensable may be in the range from about 0.2% to about 10% by volume.

It will be apparent to those versed in the art that the invention can be conducted in various types of systems designed to freeze-out $UF_6$ and then heat the solid in situ to convert it to either a liquid or a vapor, as may be desired. The invention is not limited to the use of nitrogen as the additive gas, but encompasses the addition of other relatively noncondensable, nonreactive gases—as, for example, the noble gases. The term "relatively noncondensable gas" is used herein to refer to gases which are difficult to condense relative to $UF_6$.

In accordance with our invention, the noncondensable gas is added to the desublimer feed in an amount which effects (a) substantially no increase in $UF_6$ carry-out and (b) a decrease in desublimer stresses in the heating operation. For gas-centrifuge cascade applications, we prefer to add the noncondensable in an amount providing a feed-gas concentration thereof in the range from about 0.2% to about 1% by volume. We do not wish to be bound by any theory as to the mechanism by which the incorporation of a relatively noncondensable gas in the $UF_6$ feed reduces maximum stresses. Possibly, addition of the noncondensable results in the formation of less-dense $UF_6$ deposits having internal voids which relieve stresses during heat-induced expansion of the solid $UF_6$.

The foregoing description of a preferred embodiment of the invention has been presented to explain its principles and its practical application so that others skilled in the art may use it in various embodiments and modifications suited to the contemplated use. The scope of the invention is defined by the claims appended hereto.

We claim:
1. A $UF_6$-recovery process, comprising:
   (a) withdrawing a stream of substantially pure $UF_6$ process gas from a $UF_6$ gas-centrifuge cascade,
   (b) adding a relatively noncondensable, nonreactive gaseous component to said stream to provide in said stream a concentration thereof in the range of about 0.2% to 1% by volume,
   (c) directing the resulting stream through a cooled chamber under conditions effecting desublimation of said $UF_6$ and formation of an adherent, annular solid layer of $UF_6$ on the interior of said chamber,
   (d) heating said chamber to convert said layer to a fluid, and
   (e) recovering said fluid.
2. The process of claim 1 wherein said gaseous component is nitrogen.
3. The process of claim 1 wherein said resulting stream is at subatmospheric pressure.
4. The process of claim 1 wherein the stream withdrawn in step
   (a) is $UF_6$ enriched in the uranium-235 isotope.
5. In a $UF_6$-recovery process wherein a stream of substantially pure gaseous $UF_6$ at subatmospheric pressure is fed through an externally chilled desublimer to effect direct conversion of the $UF_6$ to an annular solid layer adhering to the desublimer and wherein said desublimer subsequently is heated to convert said layer to a fluid, the method of decreasing mechanical stresses generated in said desublimer when so heated, comprising:
   adding sufficient relatively noncondensable, nonreactive gas to said stream to provide therein a concentration of from about 0.2% to 1% by volume of the noncondensable gas.
6. The process of claim 5 wherein said noncondensable gas is nitrogen.
7. The process of claim 5 wherein said stream of substantially pure $UF_6$ is derived from a gas-centrifuge cascade.
8. In a process including the steps of generating a stream of substantially pure gaseous $UF_6$, feeding said stream through an externally chilled desublimer to effect desublimation of said $UF_6$ to an annular crystalline solid adhering to the desublimer, and heating said desublimer to convert said layer to a fluid, the method of decreasing mechanical stresses generated in said desublimer when so heated, comprising:
   adding a noncondensable, nonreactive gas to said stream in an amount sufficient to provide therein a concentration of from about 0.2% to 10% by volume of the noncondensable gas.
9. The process of claim 8 wherein said noncondensable gas in nitrogen.

* * * * *